United States Patent
Ku et al.

(10) Patent No.: US 9,503,414 B1
(45) Date of Patent: Nov. 22, 2016

(54) APPARATUS AND METHOD FOR COORDINATING LIVE COMPUTER NETWORK EVENTS

(71) Applicant: Bume Box, Inc., Palo Alto, CA (US)

(72) Inventors: James Ku, San Jose, CA (US); Per Thomsen, Hughson, CA (US)

(73) Assignee: Bume Box, Inc., Palo Alto, CA (US)

( * ) Notice: Subject to any disclaimer, the term of this patent is extended or adjusted under 35 U.S.C. 154(b) by 144 days.

(21) Appl. No.: 14/203,375

(22) Filed: Mar. 10, 2014

(51) Int. Cl.
*H04L 12/58* (2006.01)

(52) U.S. Cl.
CPC ............................ *H04L 51/32* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0178041 | A1* | 11/2002 | Krantz | G06Q 10/06314 705/7.18 |
| 2005/0033615 | A1* | 2/2005 | Nguyen | G06Q 10/02 705/5 |
| 2009/0271524 | A1* | 10/2009 | Davi | H04N 21/23433 709/231 |
| 2010/0138772 | A1 | 6/2010 | Garcia et al. | |
| 2012/0079099 | A1* | 3/2012 | Dhara | G06Q 10/107 709/224 |
| 2012/0142381 | A1* | 6/2012 | Wang | H04W 4/12 455/466 |
| 2012/0215862 | A1* | 8/2012 | Cai | H04L 51/12 709/206 |
| 2012/0233273 | A1* | 9/2012 | Miner | H04L 51/14 709/206 |
| 2013/0046826 | A1* | 2/2013 | Stanton | G06Q 10/10 709/204 |
| 2013/0138673 | A1* | 5/2013 | Uemura | G06F 17/30038 707/758 |
| 2013/0275528 | A1* | 10/2013 | Miner | H04L 51/18 709/206 |
| 2013/0275880 | A1* | 10/2013 | Bachman | G06F 3/0481 715/751 |
| 2014/0047049 | A1* | 2/2014 | Poston | H04L 12/1822 709/206 |
| 2014/0095509 | A1* | 4/2014 | Patton | G06F 17/30241 707/740 |
| 2014/0172856 | A1* | 6/2014 | Imbruce | G06F 17/212 707/737 |
| 2014/0214931 | A1* | 7/2014 | Sidhu | H04L 65/403 709/204 |
| 2014/0280537 | A1* | 9/2014 | Pridmore | H04L 51/32 709/204 |
| 2014/0280566 | A1* | 9/2014 | Chen | H04L 67/306 709/204 |
| 2014/0365570 | A1* | 12/2014 | Peters | G06Q 10/107 709/204 |
| 2015/0066615 | A1* | 3/2015 | Gandhi | G06Q 50/01 705/14.16 |
| 2015/0149542 | A1* | 5/2015 | Jain | H04L 51/20 709/204 |
| 2015/0278367 | A1* | 10/2015 | Chang | G06F 17/30867 707/723 |

* cited by examiner

*Primary Examiner* — Saket K Daftuar
(74) *Attorney, Agent, or Firm* — Cooley LLP

(57) ABSTRACT

A method performed by a server in a computer network includes supplying tools to specify a live event. Messages associated with the live event are collected. Messages are collected from a social network server. The messages are processed to form ordered messages. Replies to the ordered messages are formatted. The replies include individual messages distributed to the social network server and aggregated replies available on a single page for viewing by client devices.

16 Claims, 9 Drawing Sheets

APPARATUS AND METHOD FOR COORDINATING LIVE COMPUTER NETWORK EVENTS

FIELD OF THE INVENTION

This invention relates generally to communications in computer networks. More particularly, this invention relates to techniques for coordinating network communications in connection with a live hosted event.

BACKGROUND OF THE INVENTION

Live hosted events are known in connection with television and radio broadcast mediums. In this context, a host will broadcast communications and listeners may place telephone calls to the host in an effort to participate in the broadcast.

Network messages, such as email messages, SMS text messages and social media posts are increasingly replacing telephone calls as a standard form of communication. Coordinating such disparate modes of communication in connection with a live event is a challenge.

SUMMARY OF THE INVENTION

A method performed by a server in a computer network includes supplying tools to specify a live event. Messages associated with the live event are collected. Messages are collected from a social network server. The messages are processed to form ordered messages. Replies to the ordered messages are formatted. The replies include individual messages distributed to the social network server and aggregated replies available on a single page for viewing by client devices.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
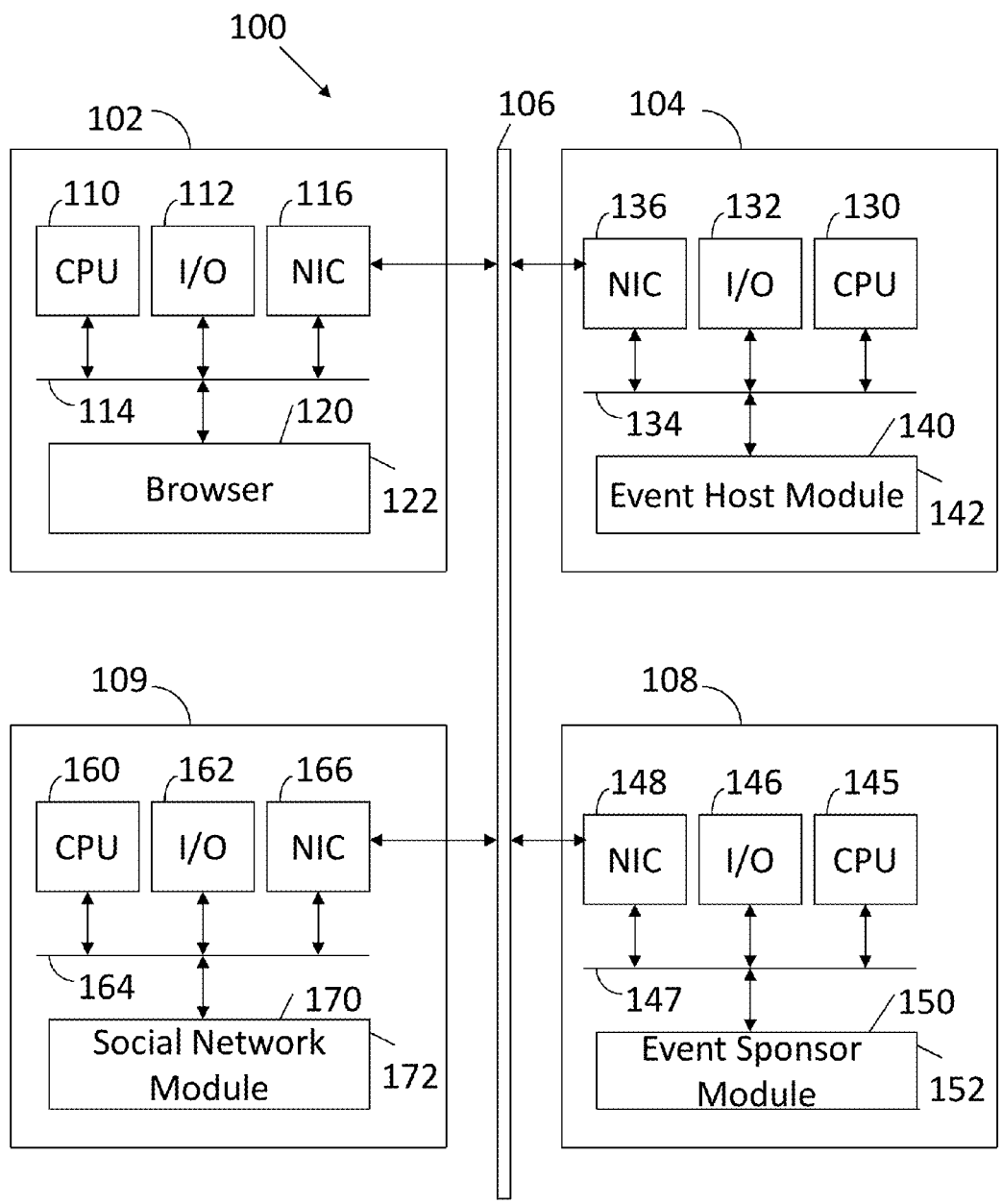
FIG. 1 illustrates a system configured in accordance with an embodiment of the invention.

FIG. 1 illustrates a system 100 configured in accordance with an embodiment of the invention. The system 100 includes one or more client devices 102 in communication with an event platform server 104 via a network 106, which may be any combination of wired and wireless network components. An event sponsor server 108 is also connected to the network 106, as is a social network server 109.

Each client device 102 may include standard components, such as a central processing unit 110 connected to input/output devices 112 via a bus 114. The input/output devices may include a keyboard, mouse, touch display and the like. A network interface circuit 116 is also connected to the bus 114 to provide connectivity to network 106. A memory 120 is also connected to the bus 114. The memory 120 stores a communication module, such as a browser 122. The client device may be a personal computer, tablet, smart phone, wearable device and the like.

The event platform server 104 also includes standard components, such as a central processing unit 130, input/output devices 132, bus 134 and network interface circuit 136 to provide connectivity to network 106. A memory 140 is also connected to the bus 134. The memory stores executable instructions, such as an event host module 142, to coordinate operations of the invention, as discussed below. The event host module may include executable instructions to store and access event data. The event data is made available to provide updates regarding an event, as demonstrated below.

The event sponsor server 108 also includes standard components, such as a central processing unit 145, input/output devices 146, bus 147 and network interface circuit 148 to provide connectivity to network 106. A memory 150 is also connected to the bus 144. The memory stores executable instructions, such as an event sponsor module 152, to interact with the event host module 142, as detailed below.

The social network server 109 also includes standard components, such as a central processing unit 160, input/output devices 162, bus 164 and network interface circuit 166 to provide connectivity to network 106. A memory 170 is also connected to the bus 164. The memory stores executable instructions, such as a social network module 172, to coordinate social network activities. The social network may be Twitter®, Facebook®, Linkedin® and the like, which provide services that allow an individual to broadcast messages to a network of followers. The social network module 172 includes an application program interface (API), which allows the event host module 142 to coordinate communications between the event host server 104 and the social network server 109, as discussed below.

Figure 2:
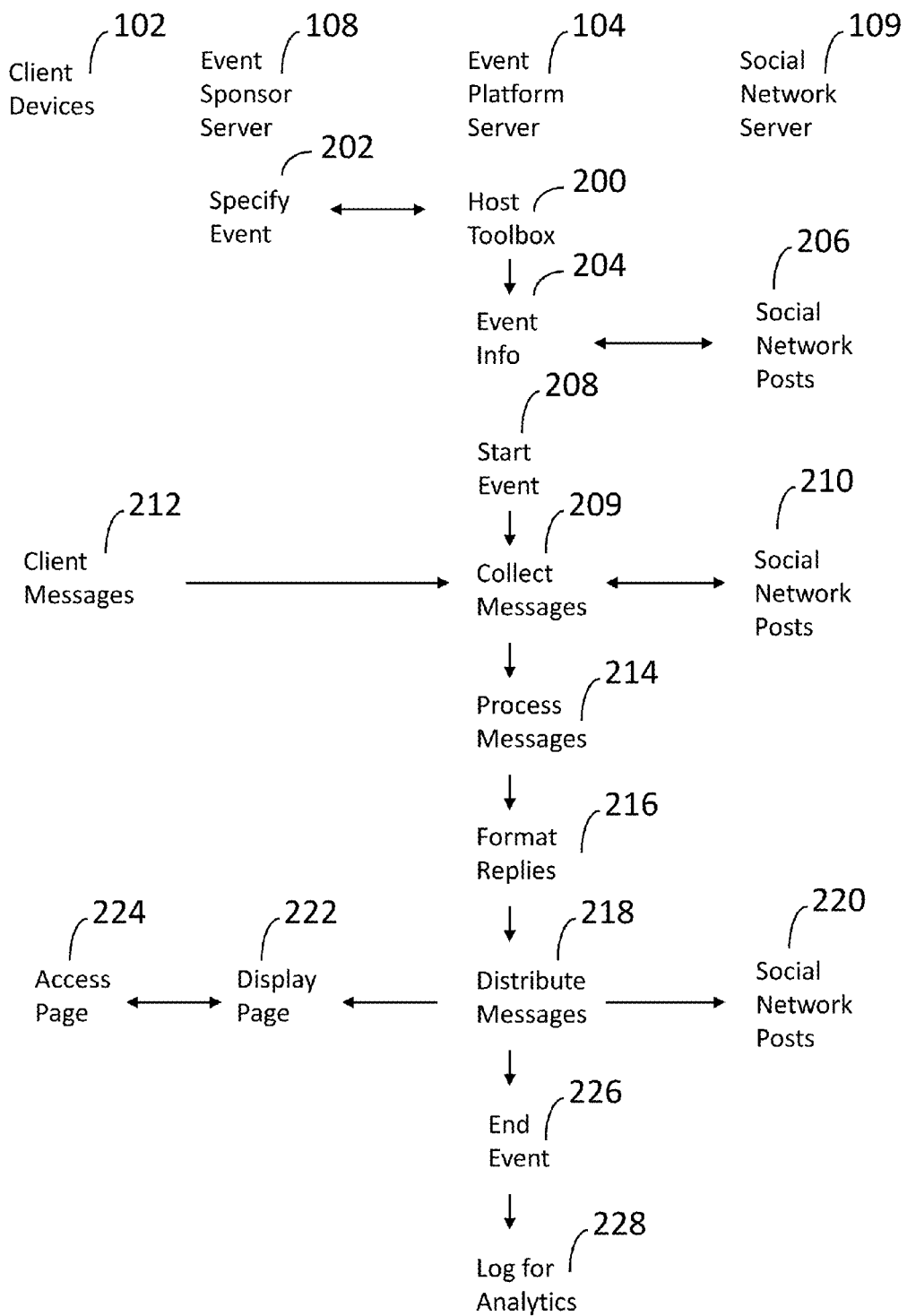
FIG. 2 illustrates processing operations associated with an embodiment of the invention.

FIG. 2 illustrates operations performed by the components of FIG. 1. The event platform server 104 hosts a toolbox 200. That is, the event host module 142 may include executable instructions to supply various tools to specify a live event. In one embodiment, the event sponsor server 108 accesses the host tool box 200 over network 106 to specify an event 202.

Figure 3:
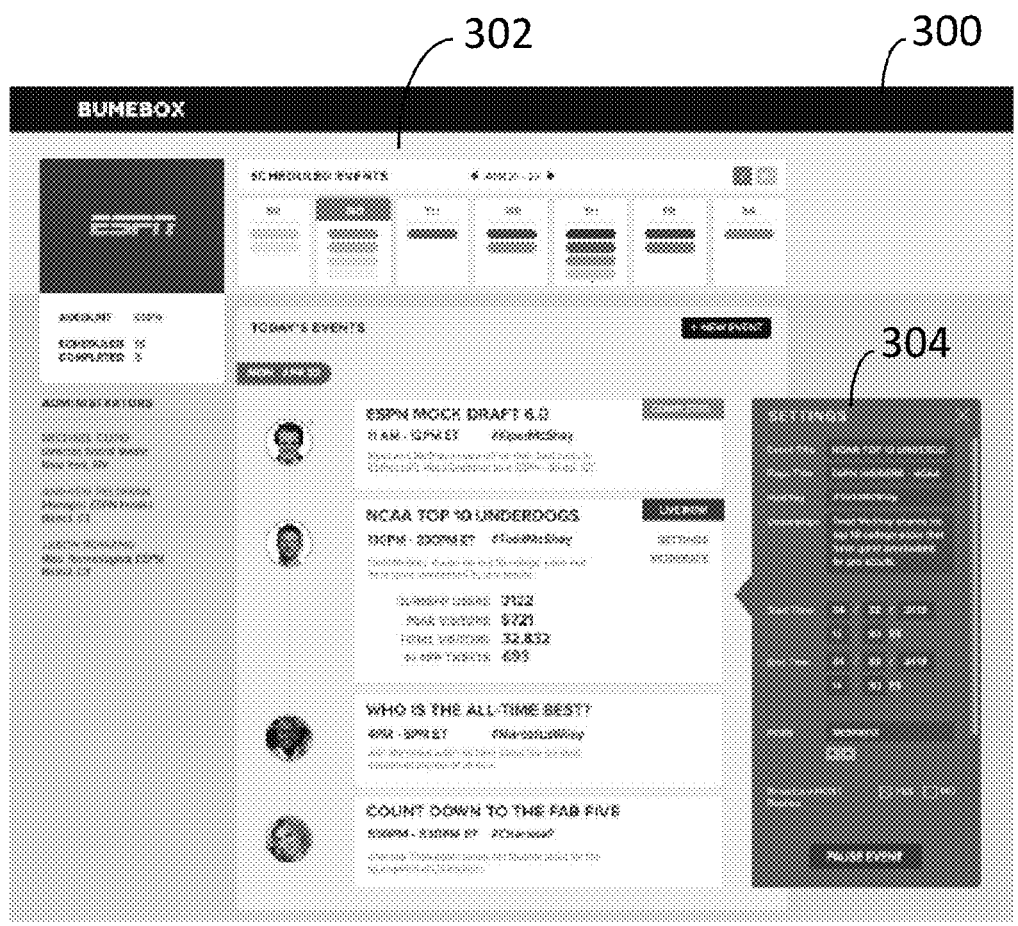
FIG. 3 illustrates an event planning tool utilized in accordance with an embodiment of the invention.

FIG. 3 illustrates an exemplary web page 300 supplied by the event platform server 104 to an event sponsor server 108. The web page 300 may include a calendar of scheduled events 302. Individual events may be scheduled through a settings interface 304, which allows one to set parameters, such as event title, page title, a hash tag, a description, a start time, an end time and a host name. After event parameters are set, event information 204 is available. The event information may be broadcast to the social network server 109 via network 106. This may result in social network posts 206. The event information 204 may also be available in the form of a web page hosted by the event sponsor server 108 and/or the event platform server 104.

In one embodiment, a social network post may promote an event and have an associated link. Activation of the link in the post may return a user to the event information 204 hosted by the event platform server 104 and/or the event sponsor server 108.

Figure 4:
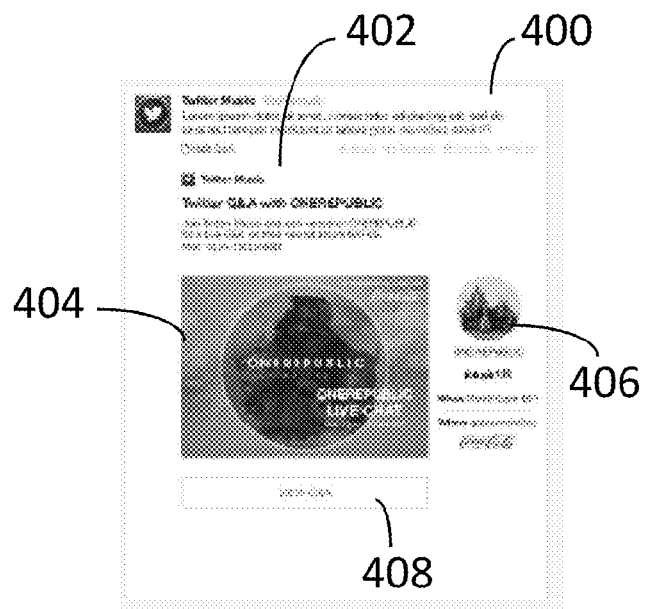
FIG. 4 illustrates a pre-event social network post utilized in accordance with an embodiment of the invention.

FIG. 4 provides an illustration of event information that may be distributed as a social network post viewable on a desktop computer or mobile device. In particular, FIG. 4 illustrates a formatted card 400, supported by Twitter®. The formatted card 400 has an event description 402, an associated graphic 404 and sponsorship information 406. This information may be from the event information 204 hosted on the event platform server 104, but the information is formatted by the social network server 109 relying upon metadata obtained from the event platform server 104.

Figure 5:
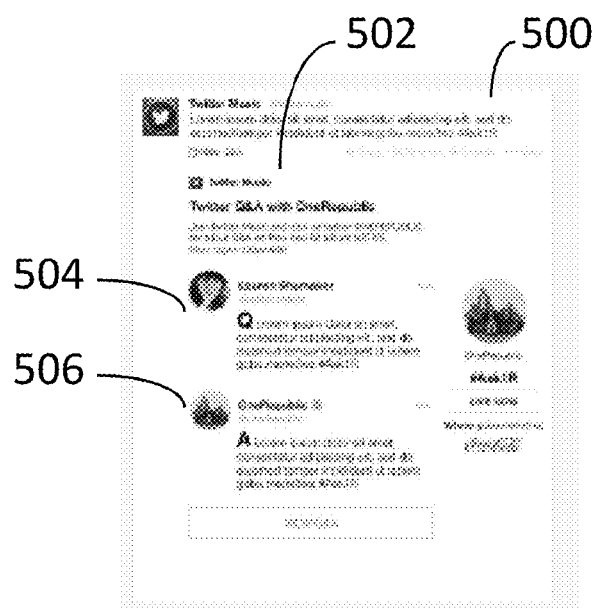
FIG. 5 illustrates a live event social network post utilized in accordance with an embodiment of the invention.

The formatted card 400 may also include a link 408. Before the event, activating the link 408 directs a user to a web page describing the event. The web page may be hosted by the event sponsor server 108 and/or the event platform server 104. During the event, the link 408 may provide a link to the event. Alternately, the card 400 may automatically display content from the event, as shown in FIG. 5. FIG. 5 illustrates an event page 500 with an event title 502 and questions 504 and answers 506 from the event in progress. Thus, FIG. 5 provides an example of a social network post associated with a moderator controlled live event.

Returning to FIG. 2 the event platform server 104 starts the event 208 at the designated time. Thereafter, it collects messages 209. The messages are delivered over the network 106 from social media posts 210 associated with social network server 109 and/or client messages 212 from client devices 102. The social network posts 210 may be pulled by the event platform server 104 based upon specified criteria. For example, a social network server 109 API may be used by the event platform server 104 to pull event specific messages by hash tag, key word or user identification.

Figure 6:
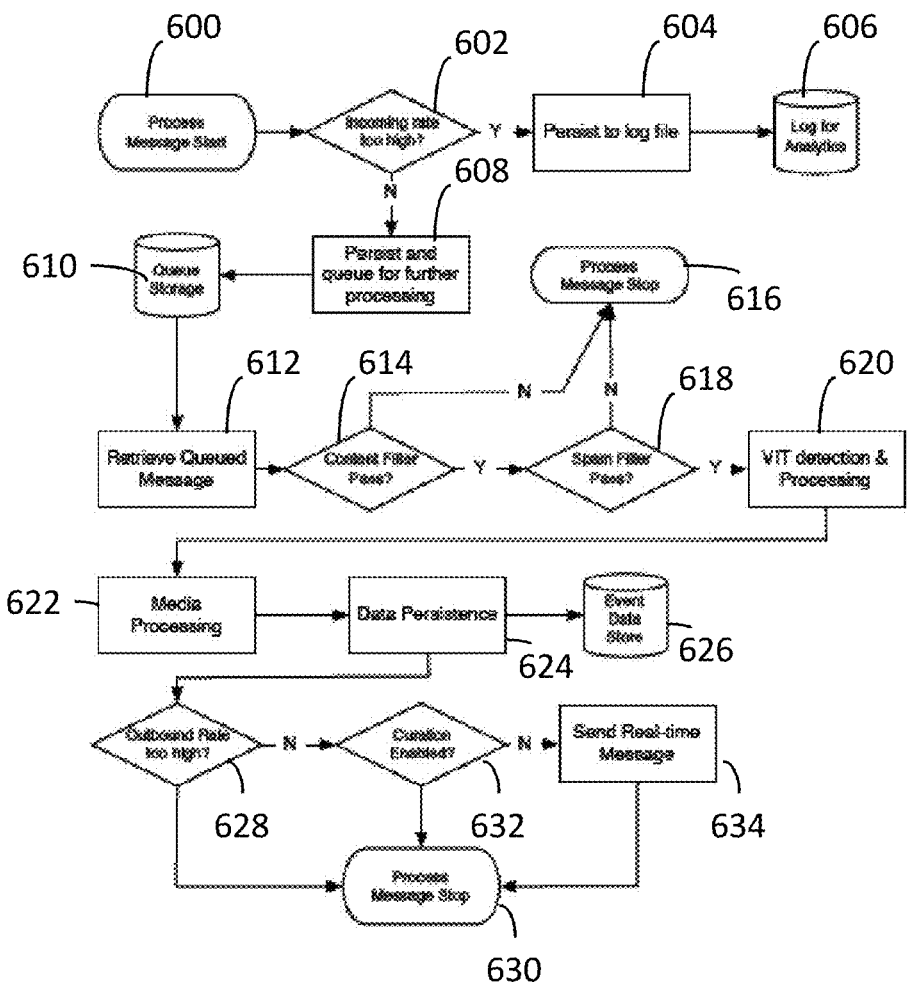
FIG. 6 illustrates message processing operations performed in accordance with an embodiment of the invention.

The messages are then processed 214 by the event platform server 104. FIG. 6 illustrates event message processing performed in accordance with an embodiment of the invention. Message processing starts 600 once the event is initiated. In one embodiment, the message inflow rate is evaluated to insure that it is not too high 602. If so (606—Yes), the messages are persisted to a log file 604. The messages are then logged for analytic purposes 606. The messages are throttled in this manner to preserve bandwidth.

If the inflow rate is not too high (602—No), then messages are persisted and queued for further processing 608. A message queue 610 stores the messages. Messages are retrieved from the queue 612. In one embodiment a content filter 614 is applied to the messages. For example, the content filter may be based upon static and user defined key terms. Certain objectionable terms may disqualify a message, while other favorable terms may prioritize a message. An adaptive filter may also be used based upon trending topics on a social network. For example, the event host module 142 may access the social network module 172 via its API to identify trending topics. For example, Twitter® hash tags may be searched and used to compile similar messages in a time line. Such topics may then be used to prioritize certain messages. If a message does not pass the content filter (614—No), then the processing of the message is halted 616.

If the content filter approves the message (614—Yes), in one embodiment the message is subject to a spam filter 618. Spam refers to undesired content, such as commercial content or other self-promoting content. Spammers employ a technique to insert their Twitter® Tweets® into an ongoing conversation by using trending hash tags to get into popular conversation. An embodiment of the invention identifies such activities to disqualify messages. An embodiment of the invention includes a spam filter that regularly monitors trending topics and uses that information to build an adaptive filter that is frequently modified to capture spam messages.

If the message does not pass the spam filter (618—No), then its processing is stopped 616. If the message is not deemed to be spam, then the message is evaluated for prioritized message senders 620. This results in ordered messages. Media processing 622 is applied to the ordered messages. The media processing may include formatting the messages for consumption by an event host.

The messages are persisted 624 to a log file 626. A reply rate is checked 628. If the reply rate is too high, then message processing is temporarily halted 630. Message processing is throttled to preserve bandwidth, if necessary. If curation is disabled 632, then message processing is halted 630. If curation is not disabled, then replies are sent 634. That is, a host is prompted to answer a prioritize message. In one embodiment, the event host module 142 allows a host to search for messages based upon hash tags, keywords or user names. Alternately, a host may coordinate replies supplied by designated message senders or social network participants.

Observe that the messages are received from social network posts 210 and client messages 212. The client messages may be sent directly to the event platform server 104 or may be sent to the event sponsor server 108, which relays them to the event platform server 104. In one embodiment, all messages may be received from and delivered to the social network server 109.

The reply is then distributed. The replies may be formatted to include individual messages distributed to the social network server and aggregated replies available on a single page for viewing by client devices.

Returning to FIG. 2, after message processing 214, replies are formatted 216 and distributed 218. For example, the replies may be sent to the social network server 109 resulting in social network posts 220. The messages may also be distributed to the event sponsor server 108, which displays a page 222, which may be accessed 224 by a client device 102. Alternately, the page may be hosted at the event platform server 104.

Figure 7:
FIG. 7 illustrates a moderator interface that may be used in accordance with an embodiment of the invention.

FIG. 7 illustrates an example moderator page 700, which may be displayed. The page 700 includes pending questions 702 and answered questions (replies) 704. Questions may contain state markers, such as question queued for reply, question was replied to and question was declined by host. The moderator page 700 informs the moderator of prioritized questions waiting for replies 706. Prioritized questions may be selected for replies.

Figure 8:
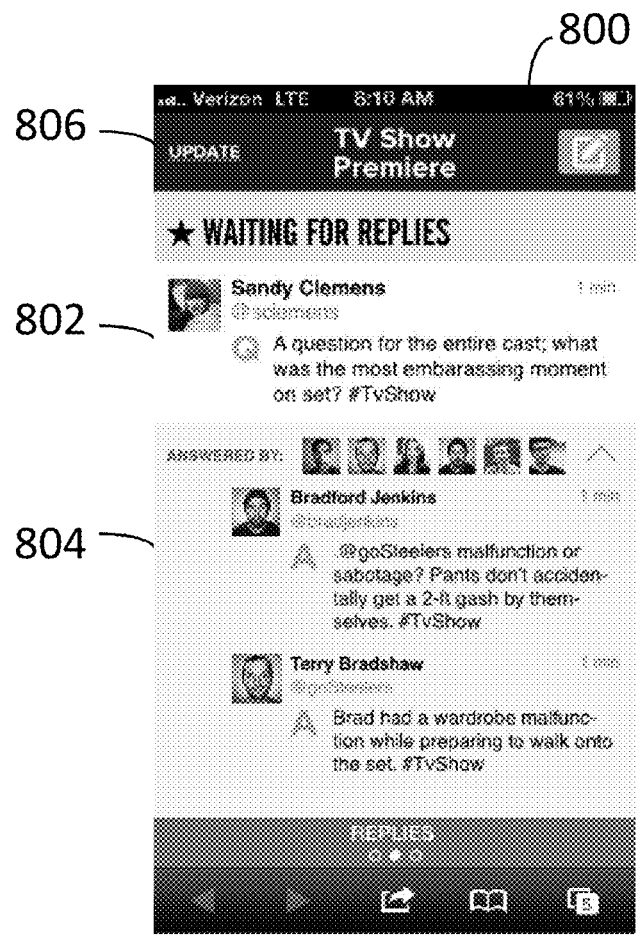
FIG. 8 illustrates a mobile moderator interface that may be used in accordance with an embodiment of the invention.

FIG. 8 illustrates an example moderator page 800 that may be displayed on a mobile device or wearable device with a smaller screen size. The page 800 includes a pending question 802 and answered questions 804. Replies may be based upon a template that includes event hash tags, short uniform resources locators and .@ options. The moderator page may be configured to keep the moderator focused on answering questions by hiding the details of answered questions. A summary may be provided of who has answered questions. An update link 806 may be used to hide all previously answered questions so that only unanswered queued questions are viewed.

Figure 9:
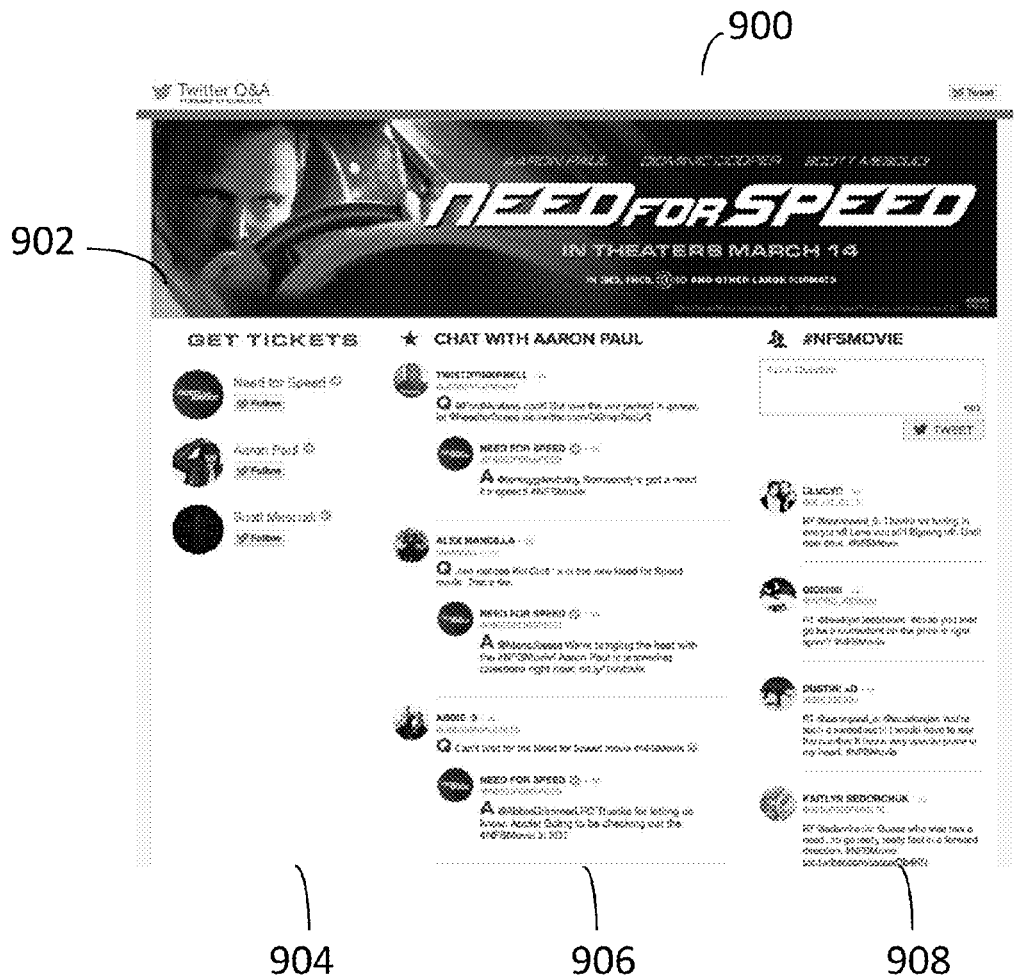
FIG. 9 illustrates a web based live event page that may be used in accordance with an embodiment of the invention.

FIG. 9 illustrates a web based event page 900 for an event follower. The event page 900 includes a description of the event 902 and host information 904. The event page 900 may also include a question and answer section 906 and miscellaneous social network posts 908 related to the event. The web based event page 900 may be served from the event sponsor server 108 or the event platform server 104.

Figure 10:
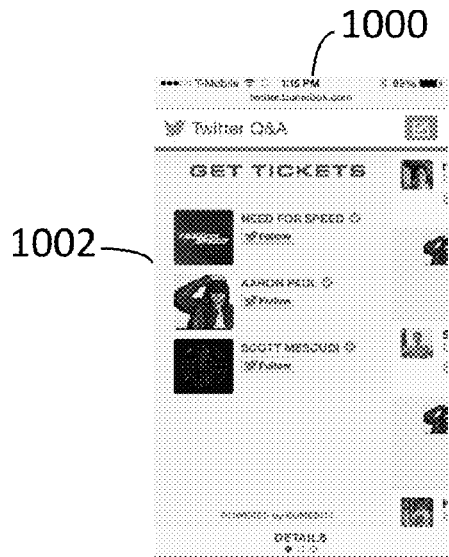
FIGS. 10-12 illustrate mobile interfaces corresponding to the web based live event page of FIG. 9.
Figure 11:
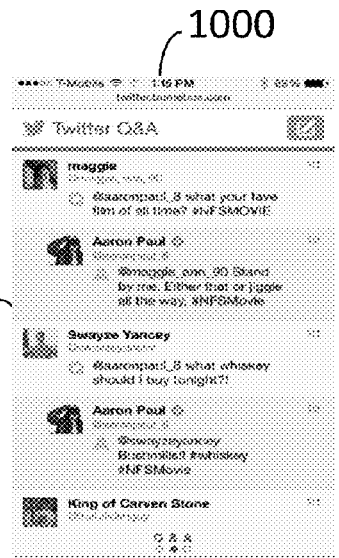
Figure 12:

FIGS. 10-12 illustrate mobile device event pages 1000 corresponding to the web based event page 900. The different pages may be accessed by swiping the touch display on the mobile device. FIG. 10 illustrates a page with host information 1002, FIG. 11 illustrates a page with questions and answers 1004 and FIG. 12 illustrates a page with miscellaneous social network posts 1006. The mobile device event pages may be served from the event sponsor server 108 or the event platform server 104.

Returning to FIG. 2, after messages are distributed 218 during the event, the event eventually ends 226 and all of the activity associated with the event is logged for analytics 228. The archived records can then be accessed, for example, by activating a link 408 associated with the previously disclosed card 400. Alternately, the event platform server 104 and/or the event sponsor server 108 may supply access to an archived event.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method performed by a server in a computer network, comprising:

supplying from the server tools to specify a broadcast live event controlled by a moderator that provides between a start time and an end time of the live event written answers to written questions;

collecting at the server messages associated with the live event, wherein collecting includes collecting messages from social network posts to a social network server, wherein collecting includes accessing an application program interface associated with the social network server to obtain the social network posts, wherein the application program interface is used to coordinate communications between the server and the social network server, and wherein each social network post is a broadcast message from the social network server to a network of followers;

processing the messages at the server to form ordered messages; and formatting replies to the ordered messages at the server, wherein the replies include individual messages distributed to the social network server for display as social network posts and aggregated replies available on a single page for viewing by client devices, wherein the replies include the written answers to the written questions.

2. The method of claim 1 wherein supplying tools to specify a live event includes supplying a web page with configurable settings for the live event.

3. The method of claim 1 wherein processing the messages includes throttling message acceptance rate, wherein the messages are messages associated with the live event controlled by the moderator.

4. The method of claim 1 wherein processing the messages includes content filtering the messages.

5. The method of claim 1 wherein processing the messages includes spam filtering the messages.

6. The method of claim 1 wherein processing the messages includes identifying prioritized message senders.

7. The method of claim 1 wherein processing the messages includes identifying trending topics on the social network server and prioritizing messages corresponding to the trending topics.

8. The method of claim 1 wherein processing the messages includes identifying trending topics on the social network server and spam filtering messages using trending topics criteria.

9. The method of claim 1 wherein the aggregated replies available on a single page include adjacent messages waiting for replies.

10. The method of claim 1 further comprising supplying event metadata to the social network server to facilitate social network posts incorporating the event metadata.

11. The method of claim 1 wherein the social network server distributes the individual messages to designated users.

12. The method of claim 11 wherein the individual messages include at least one question and at least one reply to the question.

13. The method of claim 1 wherein a social network post includes an associated link to access live event information.

14. The method of claim 1 wherein processing the messages includes identifying trending topics on the social network server by accessing the application program interface associated with the social network server.

15. The method of claim 14 wherein identifying trending topics includes pulling event specific messages by hash tag, key word or user identification.

16. The method of claim 1 wherein processing the messages includes prioritizing certain messages based upon hash tags searched through the application program interface associated with the social network server.

\* \* \* \* \*